Patented Nov. 1, 1949

2,486,579

UNITED STATES PATENT OFFICE 2,486,579

SULFOXIDE AND SULFONE COMPOUNDS

Martin E. Synerholm, Springfield, Mass., assignor to Boyce Thompson Institute For Plant Research, Inc., a corporation of New York No Drawing. Application April 13, 1949, Serial No. 87,350

4 Claims. (Cl. 260—338)

This invention relates to organic compounds, and has for its object the provision of certain new organic compounds consisting of sulfoxides and sulfones prepared by oxidation under suitable conditions of certain mercaptan addition products with safrole and isosafrole. The sulfoxides are represented by the formula

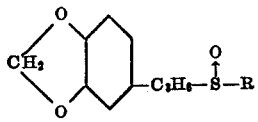

and the sulfones by the formula

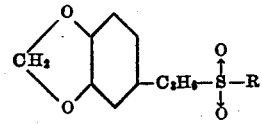

wherein R is a hydrocarbon radical containing from 2 to 12 carbon atoms. The sulfoxides have but one oxygen attached to the sulfur, while the sulfones have two oxygens attached to the sulfur.

Representative compounds of the invention are those in which R is one of the following radicals: ethyl, isopropyl, n-butyl, isobutyl, n-amyl, n-hexyl, n-octyl, n-decyl, n-dodecyl, benzyl, o-chlorobenzyl, 2,4-dichlorobenzyl, 3,4-dichlorobenzyl, phenyl, p-chlorophenyl, β-ethoxyethyl, β-butoxyethyl, β-(2-phenoxyethoxy)ethyl, and β-benzoxyethyl.

The thioethers formed by addition of mercaptans to safrole and isosafrole may be converted to their corresponding sulfoxides by mild oxidation conditions, as with an equivalent of hydrogen peroxide in acetone. Under more drastic conditions, as with an excess over two equivalents of hydrogen peroxide in acetic acid, the thioethers are oxidized to their sulfones. This application is a continuation-in-part of my application Serial No. 708,921, filed November 9, 1946, in which the compounds are claimed in insecticidal compositions comprising pyrethrum.

Specific examples illustrating the preparation of compounds of the invention follow:

Example 1

Seventy five grams (0.244 mole) of the n-octyl mercaptan-isosafrole adduct are dissolved in 275 ml. of acetone and 29 ml. (0.254 mole) of 30 per cent hydrogen peroxide are added. After standing eighteen hours, the acetone and finally the water are removed by distillation under reduced pressure. The resulting oil consists principally of the insecticidally active sulfoxide and needs no further purification before compounding. The sulfoxides are generally pale yellow, sweet smelling viscous oils.

Example 2

Thirty grams (0.12 mole) of the n-butyl mercaptan-isosafrole adduct in 200 ml. of glacial acetic acid are treated with 28 g. of 30 per cent hydrogen peroxide and allowed to stand eighteen hours. The mixture is poured into water. The precipitated sulfone is filtered and recrystallized from aqueous alcohol. The sulfones are generally white, odorless, low-melting solids.

The compounds of the invention are effective insecticides and synergists, especially with pyrethrins, non-toxic toward warm-blooded animals, and are odorless. They are also stable toward atmospheric oxygen. In this respect as well as in their effectiveness as insecticides they possess distinct advantages over the thioethers from which they are derived. The compounds are somewhat soluble in the usual organic solvents such as those of petroleum origin used for fly sprays.

I claim:

1. A compound of the group consisting of sulfoxides of the formula

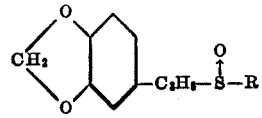

and sulfones of the formula

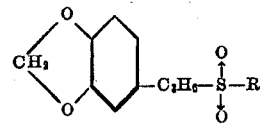

wherein R is a radical selected from the group consisting of ethyl, isopropyl, n-butyl, isobutyl, n-amyl, n-hexyl, n-octyl, n-decyl, n-dodecyl, benzyl, o-chlorobenzyl, 2,4-dichlorobenzyl, 3,4-dichlorobenzyl, phenyl, p-chlorophenyl, β-ethoxyethyl, β-butoxyethyl, β-(2-phenoxyethoxy)-ethyl, and β-benzoxyethyl.

2. A compound according to claim 1 in which R is n-hexyl.

3. A compound according to claim 1 in which R is n-octyl.

4. A compound according to claim 1 in which R is n-dodecyl.

MARTIN E. SYNERHOLM.

No references cited.